Jan. 4, 1966  E. W. SPANNHAKE  3,226,858
INERTIAL MASS, FORCE MULTIPLYING DEVICE
Filed May 1, 1963  2 Sheets-Sheet 1
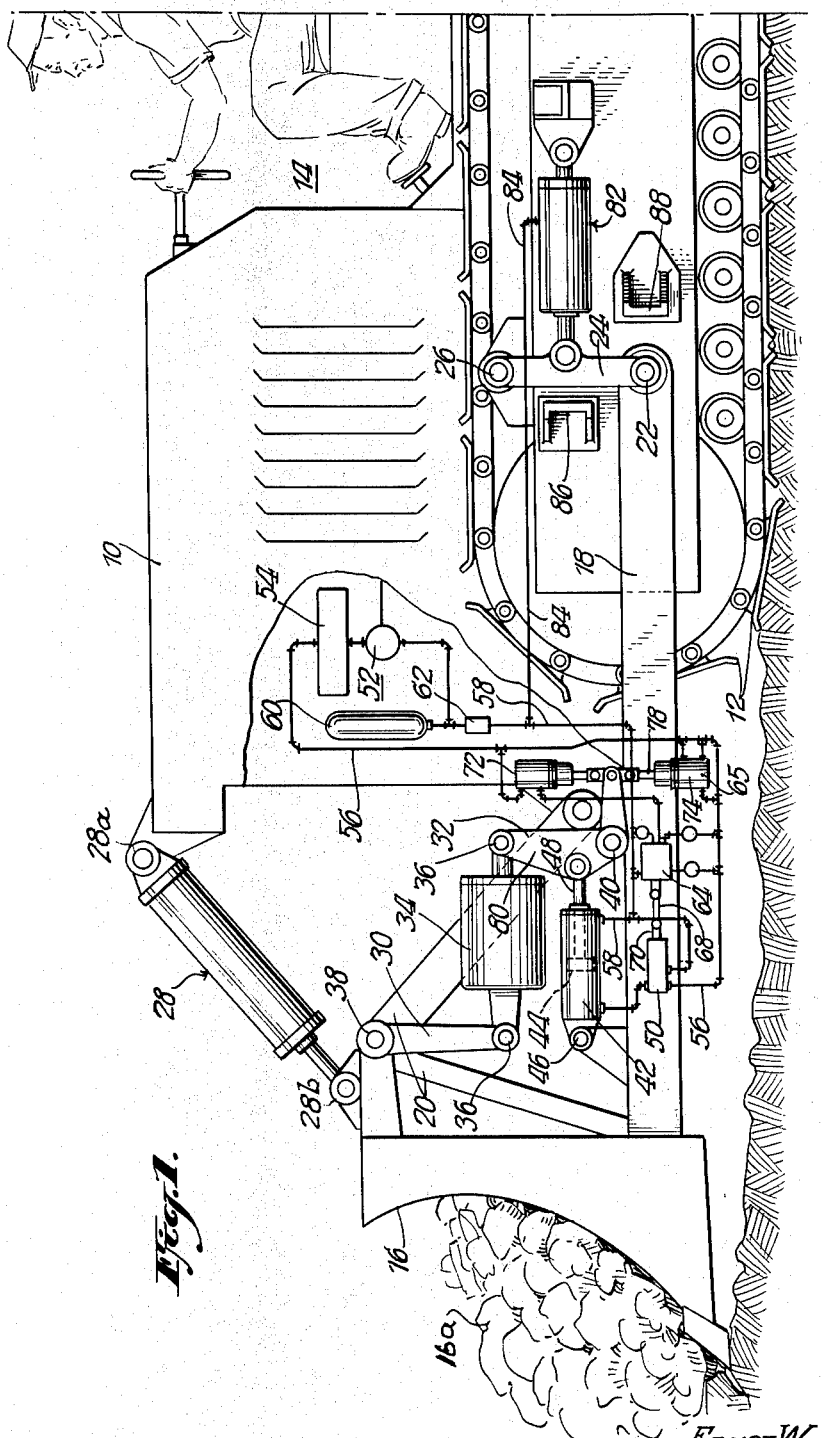
INVENTOR.
BY *Ernst W. Spannhake.*
*Ward, Neal, Haselton, Orme, & McElhannon*
ATTORNEYS.

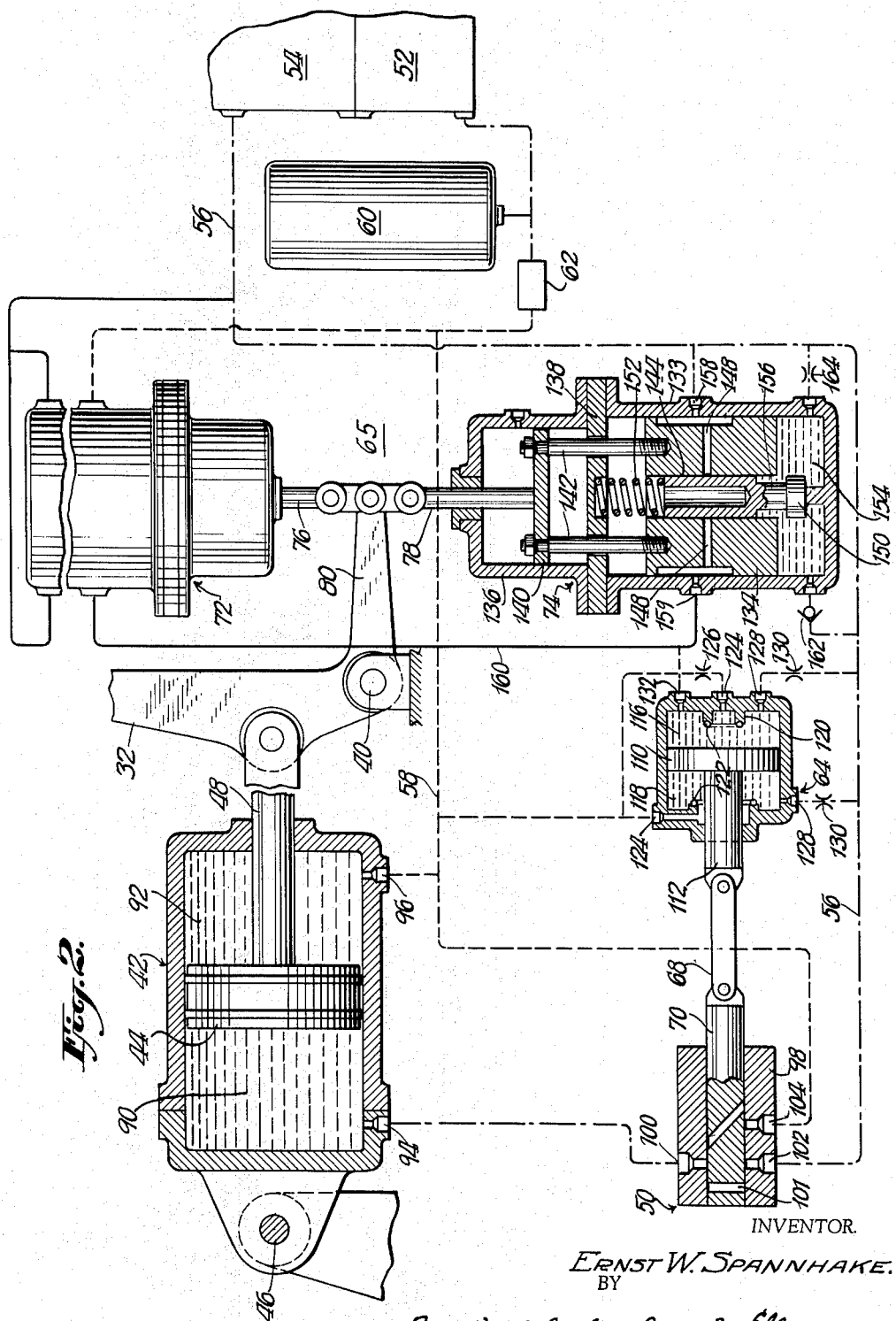

United States Patent Office 3,226,858
Patented Jan. 4, 1966

3,226,858
INERTIAL MASS, FORCE MULTIPLYING DEVICE
Ernst W. Spannhake, Smoke Rise, Butler, N.J., assignor to Raymond International Inc., New York, N.Y., a corporation of New Jersey
Filed May 1, 1963, Ser. No. 277,222
13 Claims. (Cl. 37—144)

This application is a continuation-in-part of my copending application Ser. No. 253,595, filed Jan. 24, 1963.

This invention relates to inertial force producing means and more particularly it concerns apparatus for providing or augmenting the driving capacity of certain types of industrial equipment.

One aspect of the invention concerns the utilization of forces derived from the momentum inherent in a moving object. According to this aspect, a freely swinging or otherwise constrained inertial mass mounted on a supporting equipment, is caused abruptly to change its acceleration relative to the equipment, thus transferring its kinetic energy or energy of motion to the equipment. This provides or augments the force producing capacity of the equipment by an amount proportional to the rate of velocity change undergone by the inertial mass. In the preferred embodiment of the invention, a hydraulic piston and cylinder arrangement mounted on the equipment and operated by a source of hydraulic pressure is provided to move the mass relative to the equipment, as by securing or linking the mass to a piston rod of the piston, and the necessary sudden acceleration changes are produced simply by reversing fluid flow in the cylinder. This tends to inhibit further motion of the piston which under the influence of the moving inertial mass sweeps through the cylinder and drives the fluid therefrom against the operating hydraulic pressure.

As the inertial mass is driven in one direction by hydraulic displacement of the piston in the cylinder, the force exerted by the piston on this mass, produces an equal and opposite force of reaction between the piston and the equipment on which the cylinder is mounted, and it is this reaction force which is utilized in accordance with the principle of the present invention to effect a work performing function. Thus the equipment in question may comprise simply a framework secured to the top of a pile or pile casing to be driven into the ground, or it may be the movable member of a forging press, or the earth displacing blade of a bulldozer, etc. The present invention is more particularly directed to the latter embodiment. If, therefore, the force exerted by the piston on the inertial mass is greater in one direction of reciprocation than the other, as can be obtained by the use of a differential piston as explained below, the resulting reaction against the equipment in the first direction of reciprocation can be utilized to provide or augment the desired work producing operation, without appreciable loss of effectiveness or other undesirable action during the piston return stroke.

It will be seen that by virtue of this principle of operation, the present invention does not employ the inertial mass as an impact tool, nor does it abstract the kinetic energy from the moving mass in this way, i.e., by causing it to strike an object and thus be brought abruptly to rest. Nor does it operate on the principle of abruptly stopping the inertial mass by means of a "hydraulic lock," as by suddenly closing the valve ports, when the piston movement has accelerated the mass to a selected velocity. For generating forces of the magnitude which the present invention contemplates, such technique would result in breakage of the equipment and bursting of hydraulic lines involved in such a hydraulic lock. Inertial force producing systems based on either of the above expedients, i.e., impact or hydraulic lock, involve as requisite steps of: first, the imparting of forward gathering momentum to the mass; secondly, energy transfer by impact or hydraulic lock; and thirdly, repositioning of the mass for repeating this cycle of operations.

By contrast and in accordance with the principle of the present invention, the abstraction of kinetic energy from the moving mass and the repositioning of the mass are combined in one operation by a simple force reversal in the hydraulic cylinder, utilizing only substantially the normal operating hydraulic pressure of the system, and in fact assuring that the pressure in this cylinder and connecting conduits never exceeds the normal operating pressure by more than about 10–20%. Thus the system operation of the invention employs only two significant steps: i.e., first, force on the inertial mass in the forward direction, with corresponding reaction force on the equipment in the rearward direction; and secondly, force on the inertial mass in the rearward direction with corresponding force on the equipment in the forward direction. The first step diminishes the driving force, the second step augments it. The time integral of the force, or the average force exerted during the aforesaid cycle is not changed by the apparatus of the invention. The application of the force, however, is modified into a duration of high force followed by a duration wherein the total exerted force is almost zero or even negative. This mode of operation proves extremely practical in cases where the total resistance of the material to be worked (a mound of dirt, a tree, a pile) exceeds the steady force which the equipment is capable of exerting.

A basic objective of the invention is to multiply the capability of overcoming resistance or of augmenting preferably by at least three times, the force that the equipment is normally capable of sustaining without this invention. This implies from the above that during the first mentioned state of applying force to the equipment in the reverse direction hydraulically, this force, except in very rare cases, should not exceed the steady bias force on the equipment, as otherwise the equipment will be jerked back from the workpiece with corresponding loss of efficiency. It is a definite advantage to provide means whereby the forward acting multiplying force— although completely controlled and not of a blow-like nature (hence of considerable duration in time)—is made considerably greater (between 3 and 4 times as great) than the force retarding the equipment. Mechanical devices which have heretofore been designed to achieve similar affects have always been hampered by: (a) the dependence of force upon frequency; (b) the inability to exceed the ratio of 2:1 between forward and rearward component of the force with any practical apparatus.

A main feature of the present invention thus resides in the production of the abrupt change of acceleration at a point in the movement of the inertial mass where most effective and efficient utilization of its kinetic energy can be obtained. It has been found for example that from considerations of machinery limitations and equipment movements as well as for overall effectiveness, the optimum instant of abrupt change of velocity depends upon both the location of the inertial mass (and consequently the position of the piston within the hydraulic cylinder) as well as on its velocity. According to the present invention, means are provided which take both these factors into account so that optimum operating conditions are automatically maintained irrespective of changes which may be introduced either intentionally or accidentally into the inertial system parameters.

It is an object of this invention, therefore, to provide an improved inertial force developing or augmenting means for use with driving, pushing, or vibration equipment.

It is another object of the present invention to impart versatility to such equipment through the provision of vibratory inertial force producing means having self-adaptive capabilities.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A preferred embodiment of the invention has been chosen for purposes of illustration and description, and is shown in the accompanying drawings, forming a part of the specification, wherein:

FIG. 1 is a drawing, partially in schematic, showing a bulldozer type vehicle adapted to incorporate the principles of the present invention; while FIG. 2 is a schematic diagram illustrating the operative hydraulic elements of the inertial force producing arrangement shown in FIG. 1.

Referring to FIG. 1 the bulldozer apparatus shown is seen to include a body portion 10 mounted to ride upon cleated tracks 12. A pusher blade 16 is adjustably mounted at the front of the bulldozer structure by means of horizontal main beam members as at 18. The main beam members extend horizontally from the bottom of the pusher blade to pivotal connections, as at 22, with vertical link members, as at 24, which in turn are pivotally mounted on the frame of the bulldozer by means of associated trunnions, as at 26. A hydraulic lift cylinder and piston assembly 28 is connected between a point 28a near the front of the body portion of the bulldozer structure and a point 28b near the top of the pusher blade 16.

An inertial assembly comprising upper and lower swinging links 30 and 32, and an inertial mass 34 is mounted in free-swinging arrangement on the pusher blade 16 and the beam members 18. The links are pivotally connected at one end thereof to points 36 on either side of the inertial mass. The remaining ends of the links are pivotally connected, respectively, to points 38 and 40 at the top of the pusher blade and on the main beam members 18, respectively. A driving arrangement comprising a main hydraulic cylinder 42 shown here as a differential cylinder, and having a main piston 44 therein, is arranged to induce swinging movements in the inertial assembly. One end of the main hydraulic cylinder 42 is pivotally connected to a point 46 near the bottom of the pusher blade 16. The piston 44 in turn is connected via a piston rod 48 to a point on the lower swinging link 32 intermediate its points of attachment to the inertial mass and to the main beam member 18. As the piston moves within the cylinder, the lower link 32 and the inertial mass 34 are caused to swing accordingly.

The movements of the piston within the main hydraulic cylinder are induced and controlled by means of high pressure hydraulic fluid supplied via a switching valve 50 from a source of hydraulic pressure having a pressure feed line 58 and a drainage line 56. The pressure feed line 58 is connected to a pump 52 while the drainage line 56 is connected to a sump or reservoir 54. An accumulator 60 is connected into the feed line 58 to smooth out any high pressure surges which may otherwise occur in the system. A main system valve 62 is provided in the pressure line to permit turning the inertial force augmentation system on and off as desired.

The switching valve 50, which controls the force acting on the differential cylinder 42 is actuated by an hydraulic servo-unit 64. The operation of this unit is controlled by means of a control valve indicated generally by 65, and including upper and lower control members 72 and 74. As will be explained herein, the control valve 65 operates in response to a prescribed value of velocity and position of the swinging inertial mass to generate a pressure signal to the servo-piston to move the switching valve thus changing the force acting on the inertial mass.

A hydraulic force biasing arrangement comprising a further cylinder and piston combination 82 is mounted between the frame portion of the bulldozer structure and a point approximately midway of the vertical link 24 which connects the main beam to the body of the bulldozer. Hydraulic fluid is supplied at a constant pressure to a port 84 at the rear portion of the cylinder to apply a force bias on the pusher blade forwardly. The size of the piston and cylinder surfaces is such that, the force exerted is slightly smaller than the maximum pushing capability of the cleated tracks 12. Stops 86 and 88 limit motion of link 24 within fixed limits.

To initiate operation, the main valve 62 is opened to permit hydraulic fluid under high pressure to flow into the inertial mass actuating system. This causes the inertial assembly to begin motion. When the mass is swinging forward and achieves a predetermined position and velocity, the switching valve 50 is made to move into its other extreme position thus reversing the direction of hydraulic force on the main hydraulic cylinder 42. This force in turn drives the blade 16 forwardly against the resistance of the earth 16a, and augments the force already being exerted on the pusher blade by means of the bulldozer itself.

It can be seen that as the blade moves forward against the earth resistance as a result of the extra force being applied from the inertial system, the force impulses of the inertial system on the pusher blade do not effect any type of jerky reaction upon the tractor body itself, by reason of being compensated by motion of link 24 and force bias cylinder 82. This occurs since the mechanism only need be used if the normal pushing capacity of the cleated tracks is exceeded. In this case cylinder 82 is normally compressed since the cleated tracks are used to their maximum capacity. When blade 16 is driven forwardly against earth pile 16a the whole tractor need not follow this motion at once since cylinder 82 will now expand. On the reverse stroke of the swinging mass, cylinder 82 will recompress allowing the tractor to move forward at an essentially even pace. It is clear from this description that during the rearward or retrieving portion of the cycle the hydraulic force on the blade exerted by cycling cylinder 42 should in magnitude be equal to or smaller than the force exerted by force bias cylinder 82.

FIG. 2 shows an enlarged and considerably more detailed arrangement of the hydraulic elements which coact to control the movements of the swinging link. In this figure, the differential cylinder 42 is shown with a constant pressure compartment 92 and a control compartment 90. Switching of force is done by connecting compartment 90 through switching valve 50 to either pressure line 58 or drainage line 56 in a manner well known to the art, while rear chamber 92 of cylinder 42 is permanently connected to pressure.

The servo-unit 64 is shown as a differential servo cylinder having a servo piston 110, a control chamber 116 and a control port 132. It possesses holding ports 120 and 122 with associated hydraulic circuiting indicated by symbols and numerals 124, 126, 128 and 130 which serve in a well known manner to hold it in either of its extreme positions between motions.

The lower control member 74 is seen to include a housing 133 having an outlet port 158 and an inlet port 159. Connection between these two ports is selectively established by passage 148 in an outer sliding piston member 134. Passage 148 is selectively blocked by an inner sliding piston member 150, it being open when passage 156 communicates with passage 148. The lower end of the outer sliding piston member 134 forms with housing 133 a pumping pressure chamber 154 by reason of inlet valve 162 and outlet throttle 164.

The position of the outer sliding piston member 134 is determined by the position of main piston 44 through bell crank 80 of the swinging linkage and connecting rod 78. The connecting rod 78 is attached through a movable plate 140 and a pair of rods 142 depending from the plate, to the outer sliding piston 134. The position of the inner sliding piston member 150 is established by the pressure in pressure chamber 154 acting against counterspring 152 which in turn is restrained by a stationary plate 138. This plate 138 is secured between the housing 134 and a cap 136. Due to throttle 164 this pressure will increase with increasing velocity of sliding member 134.

It can be seen that on the half cycle where the lower control member 74 is effective, piston 44 is forced to the left with servo-piston 110 being in its left hand position. Outlet 158 as shown is connected to the drain line. If it is suddenly connected to inlet port 159, the servo-unit 64 will experience a pressure drop at its control port 132 thus being forced to its extreme right hand position. This reverses the force on differential cylinder 42 through switching valve 50. It can furthermore be seen that if the velocity of piston 44 and its connected inertial mass system becomes excessive, the pressure in chamber 154, will force piston 150 upwardly unblocking passage 156 into communication with passage 148 sooner, thus reversing the force earlier and preventing excessive swing of the inertial mass.

In a like manner upper control member 72 will establish a sudden positive pressure on communication of its inlet and outlet ports thus forcing servo-piston 110 and switching valve 50 back to its extreme left hand position at the proper moment. The action of control valve 65 is therefore the establishment of a cyclic swinging motion of the inertial mass system with the stroke being limited by the described velocity compensation. The sudden positive pressure from the upper control member 72 and the sudden pressure drop from the lower control member 74 are both communicated to the servo-unit 64 via a common hydraulic line 160.

The significance of the above-described apparatus will be more readily appreciated by considering the flow of hydraulic fluids and the sequence of valve switching as the weight 34 moves through a complete cycle.

As stated above, the piston 110 in the servo unit 64 is caused, by virtue of the various ports associated with that unit, to remain in either of its extreme positions (right or left) until pressure surges (positive or negative) appear at port 132. Assuming the piston 110 to be in its extreme lefthand position, it will be seen that the port 100 of valve 50 communicates with port 104 so that the two ports 94 and 96, of the main cylinder 42, and their associated compartments are subjected to equal pressures. However, because the surface area of the main piston 44 is greater in the control compartment 90 than it is in the constant pressure compartment 92, there is a net force upon the piston in the righthand direction. This force acts upon the piston, and through the piston to the weight 34 so that the piston and weight under influence of this constant net force are accelerated rearwardly. This rearward movement causes the bellcrank 80 to actuate the sliding piston member 134 of the lower control member 74 so that it moves downwardly under the same acceleration. As the velocity of the sliding piston member 134 increases, the pressure in the chamber 154 also increases, causing the inner sliding piston member 150 to be forced upwardly by a proportionate amount. Thus, when the velocity of the swinging weight 34 and sliding member 134 reach a predetermined value, the sliding piston member 150 rises far enough to establish communication between the inlet and outlet ports 158 and 159 of the lower control member 74. When this occurs, the port 132 of the servo cylinder 62 is then placed in direct communication with the drain pressure of line 56. Accordingly, the chamber 116 of the servo unit 64 experiences a sudden negative pressure surge which induces the piston 110 to move toward its extreme righthand position, thus switching the position of the control valve 50. This switching of the control valve 50 places port 100 in communication with port 102 thus subjecting the control compartment 90 of the main cylinder to drain pressure while the constant pressure compartment 92 remains under high pressure. This results in a reversal of the net force upon the piston 44 causing it to move in the lefthand direction. This net leftward force causes a reverse acceleration to be imposed upon the swinging weight 34 which in turn causes the velocity in the righthand direction to decrease to zero and then increase in a negative or lefthand direction toward a maximum value at which time the upper control member 72 causes a switching of the servo unit 64 and valve 50 in a manner similar to that described in conjunction with the lower control member 74.

It can be seen that switching of the forces acting between the weight 34 and the pusher blade 16 are controlled by the velocity at which the weight is swinging; and that this in turn is varied by adjustment of the variable orifice 164 of the control member. The pressures and switching may thus be controlled so that the weight is first swung forwardly for a longer duration by a force which is insufficient to react upon the dozer and pull it back from its work; and then for a shorter duration is acted upon by a much higher force whose action upon the weight slows it down and reverses its swing and whose reaction upon the dozer blade augments the dozer force.

What is claimed is:

1. A force producing apparatus comprising an inertial mass supported for movement along a given path relative to a frame member, means for applying a given force to move said mass along said given path, a first hydraulic valve element having fluid passages therethrough, said element constrained to movement along a given line and connected to be moved in direct proportion to the movements of said inertial mass, a second hydraulic valve element also having fluid passages therethrough, said second element being in slidable contact with said first element and connected to move at a velocity proportional to the acceleration of said mass, and means responsive to hydraulic communication through said hydraulic valve elements abruptly to reverse the direction of action of said force applying means.

2. A force producing apparatus comprising an inertial mass supported for movement along a given path relative to a frame member, means for applying a given force to move said mass along said path, a first hydraulic valve element having fluid passages therethrough, said first valve element being constrained to movement along a given line and connected to be moved in direct proportion to the movements of said inertial mass, a resiliently restrained second hydraulic valve element constrained to slidable movement within said first valve element, means including an orifice hydraulically connecting said first and second valve elements such that said second element is moved against its resilient restrain in proportion to the velocity of said first element, said hydraulic valve elements being configured to define a fluid passageway which is opened when the valve elements are at one position relative to each other and which is closed when said valve elements are at other positions relative to each other, and means responsive to the opening of said fluid passage by movement of said hydraulic valve elements abruptly to reverse the direction of action of said force applying means.

3. A force producing device comprising an intertial mass constrained to movement along a given line with respect to a frame member, a piston type hydraulic pump having a throttling restriction at the output thereof; said hydraulic pump having a main piston driven by movements of said inertial mass, the main piston having a longitudinal bore extending therethrough, an inner piston provided in close fitting slidable relationship within the longitudinal bore extending through said main piston and resiliently biased in the direction of compressive movement of said main piston, said inner and main pistons each carrying therewith transverse fluid passages which achieve communication when a given combination of the position and velocity of said main piston reaches a predetermined value, and hydraulic means responsive to the communication of said transverse fluid passages abruptly to restrict further movement of said inertial mass relative to said frame member.

4. A force producing device comprising an inertial mass constrained to movement in a given direction along a frame member, a hydraulic piston and cylinder connected respectively to said inertial mass and said frame member in such a manner that said piston sweeps through said cylinder as said inertial mass moves along said given direction, a hydraulic valve means operative in a first condition to direct high pressure hydraulic fluid into one end of said hydraulic cylinder while permitting fluid to be exhausted from the other end of said cylinder and in a second condition to prevent fluid flow from said other end of said cylinder, a piston type hydraulic pump having a throttling restriction at the output thereof, said hydraulic pump having a main piston driven by movements of said inertial mass, the main piston having a longitudinal bore extending therethrough, an inner piston provided in close fitting slidable relationship within the longitudinal bore extending through said main piston and resiliently biased in the direction of compressive movement of said main piston, said inner and main pistons each carrying therewith transverse fluid passages which achieve communication when a given combination of the position and velocity of said main piston reaches a predetermined value, means initially placing said hydraulic valve means in said first condition, and means responsive to communication between said transverse fluid passages abruptly to place said hydraulic valve means in said second condition.

5. A force producing apparatus comprising an inertial mass constrained to movement in a given direction along a frame member, a hydraulic piston and cylinder connected respectively to said inertial mass and said frame member in such a manner that said piston sweeps through said cylinder as said inertial mass moves along said given direction, an hydraulic valve means having a control element movable between first and second positions, said valve means being adapted to direct high pressure hydraulic fluid into one end of said hydraulic cylinder while permitting fluid to be exhausted from the other end of said cylinder when said control element is in said first position and to prevent fluid flow from said other end of said cylinder when said control element is in said second position, a hydraulic servo-unit capable of normally maintaining said control element in said first position, said servo-unit being responsive to an applied hydraulic pressure surge to move said control element to said second position, and means responsive to a given combination of the velocity and position of said inertial mass achieving a prescribed value to apply a pressure surge to said hydraulic servo-unit.

6. The apparatus described in claim 5 wherein said hydraulic servo-unit comprises a cylinder having a closely fitted piston therein, said piston being connected to the movable element of said hydraulic valve, a wall extending from and surrounding a given area on the inner surface of one end of said cylinder, the top edge of said wall providing a fluid tight seal with a corresponding area on one surface of said piston in its normal position, hydraulic flow means including means for applying high hydraulic pressure at each end of said cylinder, the pressure applied at said one end being applied within said given area, and means for directing applied pressure surges to the remaining portion of said one end of said cylinder.

7. A force producing apparatus comprising an inertial mass constrained to movement in a given direction along a frame member, a hydraulic piston and cylinder connected respectively to said inertial mass and said frame member in such a manner that said piston sweeps through said cylinder as said inertial mass moves along said given direction, a hydraulic valve means having a control element movable between extended and retracted positions, said valve means being operative in the extended position of said control element to direct high pressure fluid into one end of said cylinder while permitting fluid to be exhausted from the other end of said cylinder and in the retracted position to direct high pressure fluid into said other end of said cylinder while permitting fluid to be exhausted from said one end, said hydraulic valve means capable of hydraulically sealing said cylinder intermediate said extended and retracted positions of said control element, a hydraulic servo-unit responsive to applied hydraulic pressure surges to move said control element between its extended and retracted positions, a pair of hydraulic servo-unit actuating mechanisms operative to produce positive and negative hydraulic pressure surges respectively when the velocity and position of said piston in the forward and reverse directions within said hydraulic cylinder exceeds predetermined limits, and means for transmitting pressure surges from said hydraulic servo-unit actuating mechanisms to said hydraulic servo-unit.

8. A bulldozer pusher blade force augmenting means comprising an inertial mass suspended by means of pivoted links to swing in the direction of operative movement of said pusher blade, a hydraulic cylinder mounted on said pusher blade in alignment with the path of movement of said inertial mass, a piston closely fitted within said cylinder, said piston having a piston rod extending outwardly from one end of said cylinder and attached to move with said inertial mass, the transverse piston area on the side of said piston rod being less than the transverse piston area opposite said piston rod, a high pressure hydraulic source, a hydraulic control valve having an element movable between extended and retracted positions and having hydraulic passages therein which connect said high pressure hydraulic source with both ends of said hydraulic cylinder in the extended position of said element and which in the retracted position connects one end of said cylinder to a low pressure hydraulic drain while the other end remains connected to said high pressure hydraulic source, said control valve being capable of hydraulically sealing said one end of said cylinder intermediate the extended and retracted positions of said element, a hydraulic servo-unit comprising a servo cylinder having a closely fitted servo piston therein with a piston rod extending out one end of said servo-cylinder and connected to move said hydraulic control valve element upon movements of said servo piston, said servo-cylinder being provided at either end with a wall extending interiorly thereof and surrounding given areas of each end, each end wall being provided with an upper surface which provides a fluid tight seal with a surface of said servo piston when in one of two alternate stable positions, means connecting said high pressure hydraulic source to each end of said servo cylinder within the areas enclosed by said walls, means permitting egress of hydraulic fluid from either end of said servo cylinder through points outside said walls and means for applying positive and negative hydraulic pressure surges to one end of said latching means outside the area enclosed by said wall, and a hydraulic servo-unit actuating means comprising means for generating a positive pressure surge when the position and velocity of said piston in one direction achieve predetermined limits and for generating a negative pressure surge when the position and velocity of said piston in the opposite direction achieve other predetermined limits.

9. The force augmenting means described in claim 8 wherein said servo-unit actuating means comprises a pair of hydraulic housings each having a closely fitted main piston therein, means mechanically connecting said main pistons to move in opposite directions relative to their respective housings as said piston moves within its cylinder, the extreme end of each housing being closed, and being provided with a check valve inlet and a throttle restriction outlet communicating with a source of hydraulic fluid, each main piston being provided with a longitudinal bore and having a closely fitting inner piston mounted for longitudinal movement within each bore, resilient biasing means adapted to urge each inner piston toward the extreme end of its respective housing, each inner piston and main piston being provided with transverse fluid passages extending completely therethrough which passages come into alignment when the velocity and position of the main pistons achieve predetermined limits, means for connecting one end of the transverse passage in each main piston to one end of said hydraulic servo-unit and means for connecting the remaining ends of said transverse passage to a high pressure hydraulic source and a hydraulic drain respectively.

10. A bulldozer pusher blade force augmenting means comprising an inertial mass suspended by means of pivoted links to swing in the direction of operative movement of said pusher blade, a hydraulic cylinder mounted on said pusher blade in alignment with the path of movement of said inertial mass, a piston closely fitted within said cylinder, said piston having a piston rod extending outwardly from one end of said cylinder and attached to move with said inertial mass, the transverse piston area on the side of said piston rod being less than the transverse piston area opposite said piston rod, a high pressure hydraulic source, a hydraulic control valve having an element movable between extended and retracted positions and having hydraulic passages therein which connect said high pressure hydraulic source with both ends of said hydraulic cylinder in the extended position of said element and which in the retracted position connects one end of said cylinder to a low pressure hydraulic drain while the other end remains connected to said high pressure hydraulic source, said control valve being capable of hydraulically sealing said one end of said cylinder intermediate the extended and retracted positions of said elements, actuating means for alternately maintaining said element in its extended and retracted positions and for changing the position of said element whenever the position and velocity of said piston attain predetermined limits, means for mounting said pusher blade to swing in the longitudinal direction of a bulldozer between fixed limits, and hydraulic piston and cylinder means operative to urge said pusher blade forwardly of said bulldozer against one fixed limit continuously with a force somewhat less than the frictional gripping force of the tracks of said bulldozer.

11. A force producing device comprising an inertial mass, means supporting said mass for reciprocal movement along a given path, said supporting means including a frame also movable in the direction of said given path, actuating means mounted on said frame and arranged to apply given forces to said inertial mass for inducing movements of said mass along a given path and switching means operative to reverse the direction of action of said actuation means upon said inertial mass, said switching means including first means responsive to the position of said inertial mass and second means responsive to the velocity of said inertial mass, said responsive means being arranged to produce a cumulative output, said switching means being arranged to operate in response to a given value of said cumulative output.

12. A force producing device comprising an inertial mass, means supporting said mass for reciprocal movement along a given path, said supporting means including a frame also movable in the direction of said given path, actuating means comprising a hydraulic cylinder mounted on said frame and a hydraulic piston fitted within said cylinder and connected to move with said inertial mass, hydraulic fluid supply means connected to supply hydraulic fluid under a given pressure to said cylinder to cause movement therein of said piston and corresponding swinging of said inertial mass on said frame, said fluid supply means including hydraulic switching means operative to switch and reverse the direction of application of hydraulic pressure to said cylinder, first means responsive to the position of said inertial mass, second means responsive to the velocity of said inertial mass, and means associated with said first and second means for operating said switching means upon the combined output of said first and second responsive means reaching a predetermined magnitude.

13. A force producing device comprising an inertial mass supported for movement along a frame member, an hydraulic piston and cylinder means connected between said mass and said frame member in a manner causing said piston to sweep through said cylinder as said mass moves along said frame member, hydraulic valving means operable in a first condition to admit high pressure hydraulic fluid into one end of said cylinder and to release hydraulic fluid from the other end of said cylinder to drive said mass in a given direction, and operable in a second condition to prevent flow of fluid from said other end of said cylinder, first means responsive to the position of said piston within said cylinder, second means responsive to the velocity of movement of said piston through said cylinder and valve actuating means associated with said first and second means for switching said hydraulic valving means from one condition to another upon the combined output of said first and second responsive means reaching a predetermined magnitude.

References Cited by the Examiner
UNITED STATES PATENTS

| | | | |
|---|---|---|---|
| 773,111 | 10/1904 | Wood | 91—309 X |
| 2,499,620 | 3/1950 | Alderman | 37—144 |
| 2,909,157 | 10/1959 | Reis | 91—378 |
| 2,964,863 | 12/1960 | Shepherd | 37—144 |
| 2,989,950 | 6/1961 | Lockman | 91—388 |

ABRAHAM G. STONE, *Primary Examiner.*

BENJAMIN HERSH, WILLIAM A. SMITH III,
*Examiners.*